United States Patent [19]

Ott et al.

[11] Patent Number: 5,410,001
[45] Date of Patent: Apr. 25, 1995

[54] PROCESS FOR COATING ELECTRICALLY CONDUCTIVE SUBSTRATES, WATER-BASED COATINGS AND CROSSLINKING AGENTS CONTAINING MASKED NCO GROUPS

[75] Inventors: Günther Ott; Ulrich Heimann; Walter Jouck, all of Münster; Udo Reiter, Telgte, all of Germany; David J. Santure, Novi, Mich.

[73] Assignee: BASF Lacke & Farben Aktiengesellschaft, Munster, Germany

[21] Appl. No.: 216,864

[22] Filed: Mar. 23, 1994

Related U.S. Application Data

[62] Division of Ser. No. 956,763, Feb. 4, 1993, Pat. No. 5,324,402.

[51] Int. Cl.$^6$ ............................................. C08F 283/04
[52] U.S. Cl. ................................... 525/458; 525/457; 525/460; 528/45; 528/67; 528/85
[58] Field of Search ............... 525/453, 457, 458, 460, 525/45, 67, 85

[56] References Cited

U.S. PATENT DOCUMENTS 4,997,900 3/1991 Brinkman ............................... 528/45

Primary Examiner—James J. Seidleck
Assistant Examiner—Mary Critharis
Attorney, Agent, or Firm—Anne Gerry Sabourin

[57] ABSTRACT

The invention relates to a cathodic electro-dipping process wherein the electro-dipping primer employed contains a crosslinking agent which can be obtained by (I) reacting, in a first stage,
 (a) diphenylmethane diisocyanate and
 (b) a monoalcohol or a mixture of monoalcohols to give an intermediate product (A) containing isocyanate groups, and (II) reacting this intermediate product (A) in a second stage with
 (c) a polyol or a mixture of polyols to give an intermediate product (B) containing hydroxyl groups which (III) is reacted in a third stage either with
 (d) a cycloaliphatic, aliphatic or araliphatic polyisocyanate or a mixture of such polyisocyanates and
 (e) a monofunctional masking agent or a mixture of such masking agents or with
 (f) a partially-masked polyisocyanate prepared from (d) and (e)

to give a crosslinking agent which is free from isocyanate groups.

19 Claims, No Drawings

PROCESS FOR COATING ELECTRICALLY CONDUCTIVE SUBSTRATES, WATER-BASED COATINGS AND CROSSLINKING AGENTS CONTAINING MASKED NCO GROUPS

This is a divisional of application Ser. No. 07/956,763, filed on Feb. 4, 1991, U.S. Pat. No. 5,324,402.

The invention relates to a process for coating electrically conductive substrates, in which (1) the electrically conductive substrate is dipped into a water-based electro-dipping primer (2) the substrate is connected as the cathode (3) a film is deposited on the substrate by means of direct current (4) the coated substrate is removed from the electro-dipping primer and (5) the deposited film coating is baked.

The invention also relates to water-based coatings and crosslinking agents containing masked NCO groups.

The cathodic electro-dipping process described above is known (cf., for example, German Offenlegungsschrift 3,518,732, German Offenlegungsschrift 3,518,770, EP-A 4090, EP-A 12,463 and EP-A 262,069) and is employed, in particular, for priming motor vehicle bodies, especially automobile bodies.

Coatings of excellent quality can be obtained by means of the cathodic electro-dipping process—particularly if electro-dipping primers containing cationic, amine-modified epoxide resins are used as binders.

The electro-dipping primers employed for carrying out the cathodic electro-dipping process preferably contain masked polyisocyanates as crosslinking agents. It is known that if masked diphenylmethane 4,4'-diisocyanate (MDI) is used as the crosslinking agent, the troublesome discoloration (yellowing) of topcoat layers which is observed when other aromatic polyisocyanates are used does not occur. MDI can, however, not be employed without difficulty, because it exhibits a strong tendency to crystallize and thus leads to the destabilization of the electro-dipping primers. It is stated in EP-A 236,050 that stable electro-dipping primers should be obtainable using MDI containing at least 5% by weight of the 2,4'-isomer. However, commercially obtainable MDI grades meeting this condition as a rule have, disadvantageously, a high content of hydrolyzable chlorine, which results in electro-dipping primers of high chloride ion contents, ie. electro-dipping primers of increased corrosivity. It is stated in EP-A 293,088 that stable electro-dipping primers should be obtainable using MDI containing a uretonimine. However, this suggestion for solving the crystallization problem unfortunately does not lead to success in all cases. The electro-dipping primers described in EP-A 236,050 and EP-A 293,088 should be improved, not least in respect of baking temperatures and leveling properties. In addition, it is desirable to provide a process for reducing the viscosity of MDI crosslinking agents, because this makes it possible to reduce the viscosity of the electro-dipping primers and increase the layer thickness of the resulting film coatings.

The object on which the present invention is based is the provision of crosslinking agents for water-based electro-dipping primers in the use of which stable electro-dipping primers are obtained which have improved properties compared with comparable electro-dipping primers of the state of the art.

Surprisingly, this object is achieved by the provision of masked polyisocyanates which are obtainable by (I) reacting, in a first stage,
   (a) diphenylmethane diisocyanate and
   (b) a monoalcohol or a mixture of monoalcohols to give an intermediate product (A) containing isocyanate groups, and (II) reacting this intermediate product (A) in a second stage with
   (c) a polyol or a mixture of polyols to give an intermediate product (B) containing hydroxyl groups which (III) is reacted in a third stage either with
   (d) a cycloaliphatic, aliphatic or araliphatic polyisocyanate or a mixture of such polyisocyanates and
   (e) a monofunctional masking agent or a mixture of such masking agents or with
   (f) a partially-masked polyisocyanate prepared from (d) and (e)

to give a crosslinking agent which is free from isocyanate groups.

Stable electro-dipping primers of low chloride ion content can be prepared by means of the crosslinking agents according to the invention. When electro-dipping primers containing the crosslinking agents according to the invention are used, troublesome discolorations of topcoat layers do not occur. Electro-dipping primers containing the crosslinking agents according to the invention instead of the crosslinking agents described in EP-A 236,050 and EP-A 293,088 can be baked at lower baking temperatures and exhibit improved leveling properties. In addition, in comparison with comparable crosslinking agents which have been prepared using only MDI as the polyisocyanate component, the crosslinking agents according to the invention are distinguished by lower viscosities.

Grades of MDI having a low content, or no content, of hydrolyzable chlorine are employed as component (a). It is, of course, also possible to employ MDI grades having a higher content of hydrolyzable chlorine as component (a). However, there is then a risk that electro-dipping primers which cause corrosion processes on the painting equipment owing to an excessively high chloride ion concentration will be obtained.

Linear, optionally branched, aliphatic mono-alcohols having 1 to 12 C atoms in the molecule or mixtures of such monoalcohols can, for example, be employed as component (b). The following are mentioned as examples of monoalcohols of this type: methanol, ethanol, propanol, trimethylolpropane diallyl ether, butanol, pentanol, pentaerythritol triallyl ether, hexanol, heptanol, isodecanol and 2-ethylhexanol. It is also possible to employ, as the component (b), glycol ethers of the general formula $CH_3(CH_2)_n-O-(CH_2-CH_2-O-)_mH$ or mixtures of glycol ethers of this type. In the general formula n is an integer from 0 to 5, preferably 2 to 5, and m is an integer from 1 to 3, preferably 1 or 2. Propylglycol, propyldiglycol, butylglycol and butyldiglycol are mentioned as examples of glycol ethers which can be employed. It is also possible to employ, as the component (b), propylene glycol ethers of the general formula $CH_3(CH_2)_n-O-(CH_2-CHCH_3-O-)_mH$ or mixtures of propylene glycol ethers of this type (n is an integer from 0 to 5 and m is an integer from 1 to 3).

Glycol ethers or mixtures of glycol ethers of the general formula $CH_3(CH_2)_n-O-(CH_2-CH_2-O-)_mH$ described above are preferably employed as component (b).

The reaction of the components (a) and (b) can advantageously be carried out at temperatures from 20° to 80° C. The reaction can be catalyzed with catalysts, such as, for example, dibutyltin dilaurate.

It is preferable to react the components (a) and (b) with one another in a stoichiometric ratio such that 30 to 95, preferably 50 to 90, percent of the NCO groups of the component (a) are reacted, ie. masked, by the component (b).

The intermediate product (A) containing isocyanate groups and obtained from the components (a) and (b) is reacted in a second stage with the component (c) to give an intermediate product (B) containing hydroxyl groups. The reaction of the intermediate product (A) with the component (c) is advantageously carried out at temperatures from 20° to 80° C., preferably 40° to 80° C. The reaction can be carried out in the presence of catalysts, such as, for example, dibutyltin dilaurate. In general, it is advantageous to carry out the reaction of the intermediate product (A) with the component (c) in the presence of an inert diluent, such as, for example, methyl isobutyl ketone, toluene or xylene.

The amount of the component (c) employed must be at least such that all the free isocyanate groups of the intermediate product (A) can react with the component (c), and that the resulting intermediate product (B) still contains free hydroxyl groups. It is preferable to employ the component (c) in an amount such that 1.0 to 2.5, preferably 1.2 to 1.8, equivalents of hydroxyl groups are employed per equivalent of free NCO groups.

In principle, any organic compound containing, as a statistical average, at least two hydroxyl groups per molecule can be employed as component (c). It is also possible to employ mixtures of such organic compounds. Linear, optionally branched, aliphatic diols having 2 to 12 C atoms in the molecule, poly-(ethylene oxide), poly-(propyleneoxide) and poly-(ethylene oxide)(propylene oxide) having number average molecular weights of 100 to 1000, preferably 200 to 400, and linear, optionally branched, aliphatic-triols having 2 to 12 C atoms in the molecule are mentioned as examples of polyols which can be employed. Examples of suitable polyols are ethylene glycol, propylene glycols, butanediols, neopentyl glycol, hexanediols, dimethylolcyclohexane, glycerol, trimethylolethane, trimethylolpropane, trimethylolhexane, pentaerythritol, dipentaerythritol, pentaerythritol mono and diallyl ethers and trimethylolpropane allyl ether. It is preferable to employ triols, such as, for example, trimethylolpropane and glycerol, as component (c).

In a third reaction stage at least some of the hydroxyl groups present in the intermediate product (B) are reacted either with (d) a cycloaliphatic, aliphatic or araliphatic polyisocyanate or a mixture of such polyisocyanates, and (e) a monofunctional masking agent or a mixture of such masking agents, or with (f) a partially masked polyisocyanate prepared from (d) and (e).

The reaction of the intermediate product (B) with the components (d) and (e) or (f) is advantageously carried out at temperatures from 20° to 100° C., preferably 40° to 80° C. The reaction is advantageously carried out in the presence of catalysts, such as dibutyltin dilaurate. In general, it is advantageous to carry out the reaction of the intermediate product (B) with the components (d) and (e) or (f) in the presence of an inert diluent, such as, for example, toluene, xylene or methyl isobutyl ketone.

The component (d) must be employed in at least an amount such that at least 10 percent of the hydroxyl groups present in the intermediate product (B) are reacted with an isocyanate group of the component (d). The component (e) should be employed in at least an amount such that, as a statistical average, only one isocyanate group of the component (d) can react with a hydroxyl group of the intermediate product (B), and that the end product is free from isocyanate groups.

It is not absolutely necessary for the third reaction stage to be carried out only after the second reaction stage (preparation of the intermediate product (B)) has ended completely. It is also possible to start the addition of the components (d) and (e) or (f) as early as a point in time at which all the NCO groups of the components (a) have not yet been reacted with the component (c). The decisive factor is that at least part of the component (c) reacts both with NCO groups of the component (a) and with NCO groups of the component (d) or (f).

In principle, any cycloaliphatic, aliphatic or araliphatic polyisocyanate or a mixture of such polyisocyanates can be employed as the component (d). For example, it is possible to employ cycloaliphatic, araliphatic or aliphatic polyisocyanates having 4 to 25, preferably 4 to 16, C atoms and 2 to 4 isocyanate groups per molecule. The following are mentioned as examples of polyisocyanates which can be employed: ethylene 1,2-diisocyanate, tetramethylene 1,4-diisocyanate, hexamethylene 1,6-diisocyanate, 2,2,4-trimethylhexamethylene or 2,4,4-trimethylhexamethylene 1,6-diisocyanate, dodecane 1,12-diisocyanate, $\omega,\omega'$-diisocyanatodipropyl ether, cyclobutane 1,3-diisocyanate, cyclohexane 1,3-and 1,4-diisocanate [sic], 2,2-diisocyanato-1-methylcyclohexane, 2,6-diisocyanato-1-methylcyclohexane, 3-isocyanatomethyl-3,5,5-trimethylcyclohexyl isocyanate ("isophorone diisocyanate"), 1,5-, 2,5-, 1,6-and 2,6-bis-(isocyanatomethyl)-4,7-methanohexahydroindane, 1,5-, 2,5-, 1,6- and 2,6-bis-(isocyanato)-4,7-methanohexahydroindane, dicyclohexyl 2,4'-diisocyanate, dicyclohexyl 4,4'-diisocyanate, hexahydrotoluylene 2,4-diisocyanate, hexahydrotoluylene 2,6-diisocyanate, perhydrodiphenylmethane 2,4'-diisocyanate, perhydrodiphenylmethane 4,4'-diisocyanate and xylylene diisocyanate.

As a rule the aliphatic and cycloaliphatic polyisocyanates which are readily available industrially are employed as the component (d), in particular hexamethylene diisocyanate, 4,4'-di-(isocyanatocyclohexyl)methane and isophorone diisocyanate. It is particularly preferable to employ, as the component (d), the isocyanurate of hexamethylene 1,6-diisocyanate.

Monoalcohols, monoamines, oximes, alkyl aceto-acetates, dialkyl malonates, lactams and phenols or mixtures of compounds of this type can, for example, be employed as the component (e). The masking agents mentioned as component (b). and also benzyl alcohol, methyl ethyl ketoxime, acetone oxime, cyclohexanone oxime, ε-caprolactam, diethyl malonate, diethanolamine, dibutylamine, diisobutylamine and N-methylethanolamine are mentioned as examples. It is preferable to employ, as the component (e), secondary monoamines, such as, for example, diethanolamine, dibutylamine, diisobutylamine and N-methylethanolamine and/or ketoximes, such as methyl ethyl ketoxime, acetone oxime and cyclohexanone oxime.

It is particularly preferable to employ dibutylamine and methyl ethyl ketoxime as the component (e).

It is often advantageous to mix the crosslinking agents according to the invention with completely masked cycloaliphatic, aliphatic or araliphatic polyisocyanates. This can, for example, be achieved by employing a partially masked polyisocyanate having a suitably high content of completely masked polyisocyanate as component (f) in the third stage.

In principle, the crosslinking agents according to the invention can be employed in any coating which contains a binder having groups reactive towards NCO groups (for example hydroxyl groups and/or primary amino groups and/or secondary amino groups and/or thiol groups). The crosslinking agents according to the invention are preferably employed in electro-dipping primers which can be deposited at the anode and at the cathode.

Electro-dipping primers which can be deposited at the anode are described, for example, in U.S. Pat. Nos. 3,366,563, 3,369,983, 3,403,088, 3,530,054, 3,565,781 and 3,772,227.

It is particularly preferable to employ the crosslinking agents according to the invention in electro-dipping primers which can be deposited at the cathode and which contain, as the binder, cationic, amine-modified epoxide resins. Electro-dipping primers of this type are known and are described, for example, in 10 German Offenlegungsschrift 3,518,770, German Offenlegungsschrift 3,518,732, EP-B 102,501, German Offenlegungsschrift 2,701,002, U.S. Pat. No. 4,104,147, EP-A 4090, EP-A 12,463 and U.S. Pat. Nos. 4,031,050, 3,922,253, 4,101,486, 4,038,232 and 4,017,438. The preparation of the cationic, amine-modified epoxide resins involved is also described in detail in these patent documents.

Cationic, amine-modified epoxide resins are to be understood as meaning cationic reaction products formed from
(α) optionally modified polyepoxides and
(β) amines.
These cationic, amine-modified epoxide resins can be prepared by reacting the components (α) and (β) and—if necessary—subsequently protonizing the product. It is also possible, however, to react an unmodified polyepoxide with an amine and to carry out further modifications on the amine-modified epoxide resin thus obtained.

Polyepoxides are to be understood as meaning compounds containing two or more epoxide groups in the molecule.

(α)-components which are particularly preferred are compounds which can be prepared by reacting
(i) a diepoxide compound or a mixture of diepoxide compounds having an epoxide equivalent weight of less than 2000 with
(ii) a compound which, under the given reaction conditions, reacts in a monofunctional manner toward epoxide groups and contains a phenol or thiol group, or a mixture of such compounds,
the components (i) and (ii) being employed in a molar ratio of 10:1 to 1:1, preferably 4:1 to 1.5:1, and the reaction of the component (i) with the component (ii) being carried out at 100° to 190° C., if appropriate in the presence of a catalyst (cf. German Offenlegungsschrift 3,518,770).

Other (α)-components which are particularly preferred are compounds which can be prepared by a polyaddition reaction at 100° to 195° C., which is optionally carried out in the presence of a catalyst and is initiated by an initiator which reacts in a monofunctional manner and carries either an alcoholic OH group, a phenolic OH group or an SH group, of a diepoxide compound and/or a mixture of diepoxide compounds, if appropriate together with at least one monoepoxide compound, to give an epoxide resin in which the diepoxide compound and the initiator have been incorporated in a molar ratio of over 2:1 to 10:1 (cf. German Offenlegungsschift 3,518,732).

Polyepoxides which can be employed for the preparation of the particularly preferred (α)-components and can also themselves be employed as (α)-components, are polyglycidyl ethers of polyphenols prepared from polyphenols and epihalogenohydrins. Examples of polyphenols which it is very particularly preferable to employ are bisphenol A and bisphenol F. In addition 4,4'-dihydroxybenzophenone, bis-(4-hydroxyphenyl)-1,1-ethane, bis-(4-hydroxyphenyl)-1,1-isobutane, bis-(4-hydroxytertiary butylphenyl)-2,2-propane, bis-(2-hydroxynaphthyl)-methane, 1,5-dihydroxynaphthalene and phenolic novolak resins are also suitable.

Other suitable polyepoxides are polyglycidyl ethers of polyhydric alcohols, such as, for example, ethylene glycol, diethylene glycol, triethylene glycol, 1,2-propylene glycol, 1,4-propylene glycol, 1,5-pentanediol, 1,2,6-hexanetriol, glycerol and bis-(4-hydroxycyclohexyl)-2,2-propane. It is also possible to employ polyglycidyl esters of polycarboxylic acids, such as, for example, oxalic acid, succinic acid, glutaric acid, terephthalic acid, 2,6-naphthalenedicarboxylic acid or dimerized linoleic acid. Glycidyl adipate and glycidyl phthalate are typical examples.

Hydantoin epoxides, epoxidized polybutadiene and polyepoxide compounds obtained by epoxidizing an olefinically unsaturated aliphatic compound are also suitable.

Modified polyepoxides are to be understood as meaning polyepoxides in which some of the reactive groups have been reacted with a modifying compound.

The following are mentioned as examples of modifying compounds:
compounds containing carboxyl groups, such as saturated or unsaturated monocarboxylic acids (for example benzoic acid, linseed oil fatty acid, 2-ethylhexanoic acid and Versatic acid), aliphatic, cycloaliphatic and/or aromatic dicarboxylic acids of various chain lengths (for example adipic acid, sebacic acid, isophthalic acid or dimeric fatty acids), hydroxyalkylcarboxylic acids (for example lactic acid or dimethylolpropionic acid) and also polyesters containing carboxyl groups or
compounds containing amino groups, such as diethylamine and ethylhexylamine, or diamines having secondary amino groups, for example N,N'-dialkylalkylenediamines, such as dimethylethylenediamine, N,N'-dialkyl-polyoxyalkyleneamines, such as N,N'-dimethylpolyoxypropylenediamine, cyanoalkylated alkylenediamines, such as bis-N,N'-cyanoethylethylenediamine, cyanoalkylated polyoxyalkyleneamines, such as bis-N,N'-cyanoethylpolyoxypropylenediamine, polyaminoamides, such as, for example, Versamides, in particular reaction products containing terminal amino groups and formed from diamines (for example hexamethylenediamine) and polycarboxylic acids, in particular dimeric fatty acids, and monocarboxylic acids, in particular fatty acids, or the reaction product of one mole of diaminohexane with two moles of a monoglycidyl ether or monoglycidyl ester, especially glycidyl esters of e-branched fatty acids, such as Versatic acid, or compounds containing hydroxyl groups, such as neopentyl glycol, bisethoxylated neopentyl glycol, neopentyl glycol hydroxypivaiate, dimethylhydantoin-N,N'-diethanol, 1,6-hexanediol, 2,5-hexanediol, 1,4-bis-(hydroxymethyl)-cyclohexane, 1,1-isopropylidene-bis-(p-phenoxy)-2-propanol, trimethylolpropane or pentaerythritol, or aminoalcohols, such as triethanolamine or methyldiethanolamine, or alkylketimines containing hydroxyl groups, such as aminomethyl-1,3-propanediolmethyl isobutyl ketimine or tris-(hydroxymethyl)-aminomethanecyclohexanone ketimine, and also polyglcyol ethers, polyester-polyols, polyether-polyols, polycaprolactone-polyols or polycaprolactam-polyols of various functionalities and molecular weights or saturated or unsaturated fatty acid methyl esters which are transesterified in the presence of sodium methylate with hydroxyl groups of the epoxide resins.

Primary and/or secondary amines can be employed as the component ($\beta$).

The amine should preferably be a compound soluble in water. Examples of such amines are monoalkylamines and dialkylamines, such as methylamine, ethylamine, propylamine, butylamine, dimethylamine, diethylamine, dipropylamine, methylbutylamine and the like. Alkanolamines, such as, for example, methylethanolamine, diethanolamine and the like, are also suitable. Dialkylaminoalkylamines, such as, for example, dimethylaminoethylamine, diethylaminopropylamine, dimethylaminopropylamine and the like, are also suitable. It is also possible to employ amines containing ketimine groups, for example the methyl isobutyl diketimine of diethylenetriamine. Low-molecular weight amines are used in most cases, but it is also possible to use monoamines of a fairly high molecular weight.

The amines can also contain other groups, but these should not interfere with the reaction between the amine and the epoxide group and should also not result in gelling of the reaction mixture.

It is preferable to employ secondary amines as the ($\beta$)-components.

The charges required for dilutability with water and deposition by electrical means can be produced by protonation with water-soluble acids (for example boric acid, formic acid, lactic acid or preferably acetic acid).

Another possible means of introducing cationic groups into the component ($\alpha$) consists in reacting epoxide groups of the components ($\alpha$) with amine salts. The cationic, amine-modified epoxide resins can be used either as extraneously crosslinking synthetic resins or as self-crosslinking synthetic resins. Self-crosslinking, cationic, amine-modified epoxide resins can be obtained, for example, by chemical modification of the cationic, amine-modified epoxide resins. A self-crosslinking system can, for example, be obtained by reacting the cationic, amine-modified epoxide resin with a partially masked polyisocyanate which has on average one free isocyanate group per molecule and in which the masked isocyanate groups only become demasked at elevated temperatures. A precursor of the crosslinking agents according to the invention which still has, on a statistical average, one free NCO group in the molecule can also be employed as the partially masked polyisocyanate.

As a rule the crosslinking agents according to the invention are employed in an amount of 5 to 60% by weight, preferably 20 to 40% by weight, relative to the amount of cationic, amine-modified epoxide resin present in the electro-dipping primer.

In addition to the crosslinking agent according to the invention and the cationic, amine-modified epoxide resin (it is, of course, also possible to employ a mixture of different cationic, amine-modified epoxide resins), the electro-dipping primers inquestion can also contain other constituents, such as, for example, pigments, plasticizers, fillers, wetting agents, organic solvents, antioxidants etc.

The solids content of the electro-dipping primers is preferably 7 to 35 parts by weight, particularly preferably 12 to 25 parts by weight. The pH of the electro-dipping primers is between 6 and 8, preferably between 6.5 and 7.5.

The electro-dipping primer is brought into contact with an electrically conductive anode and with the electrically conductive substrate, connected as the cathode. When an electric current is passed between the anode and the cathode, a firmly adhering film coating is deposited on the cathode.

The voltage applied can vary within a wide range and can, for example, be between two and one thousand volts. It is typical, however, to use voltages between 50 and 500 volts. The current density is, as a rule, between about 10 and 100 amperes/m$^2$. The current density tends to fall off in the course of the deposition.

After the deposition the coated article is rinsed and is ready for baking.

The film coatings deposited are generally baked at temperatures from 130° to 200° C. for a time of 10 to 60 minutes, or preferably at 150° to 180° C. for a time of 15 to 30 minutes.

Any desired electrically conductive substrates can be used as the electrically conductive substrates, but it is preferable to employ metals, such as steel, aluminum, copper and the like.

The invention is illustrated in greater detail in the following examples. All data relating to parts and percentages are by weight, unless anything contrary is expressly stated.

1. Preparation of crosslinking agents 1.1 Crosslinking agent 1 according to the invention 632 parts of MDI ®Lupranat MM 103, NCO equivalent weight 145, manufactured by BASF AG) and 191 parts of methyl isobutyl ketone are placed in a reactor equipped with a stirrer, a reflux condenser and an inlet for inert gas and are heated to 50° C. 0.2 part of dibutyltin dilaurate is then added and 450 parts of butylglycol (MW 118) are run in in the course of one hour at such a rate that the internal temperature, with slight counter-cooling, remains between 50° and 55° C. The 85% strength solution of the partially masked isocyanate has an NCO equivalent weight of 1970 (a sample of this solution crystallizes after cooling to room temperature). The mixture is then diluted at this temperature with 283 parts of methyl isobutyl ketone, 25 parts of glycerol are added and the temperature is kept at 50° C. for 1 hour. NCO groups can no longer be detected in the 70% strength solution thus obtained of the intermediate product (B) containing hydroxyl groups. The OH number is 13.8. mg of KOH/g of solids (the calculated value). (This solution also crystallizes after a short time at room temperature).

606 parts of trimerized hexamethylene diisocyanate 1,6 (®Basonat PLR 8638, manufactured by BASF AG, NCO equivalent weight 185) are then added at 50° C. to 1581 parts of the intermediate product (B) containing hydroxyl groups. After 15 minutes, 386 parts of di-n-butylamine are added dropwise in the course of 1 hour, and the mixture is then diluted with 425 parts of methyl isobutyl ketone. This gives a clear, liquid solution which does not crystallize even after storage for several weeks.

| Characteristic values: | |
| --- | --- |
| Solids content (1 hour at 130° C.): | 71% |
| Isocyanate content: | 0 |
| Amine number: | 0 |
| Original viscosity at 23° C.: (plate-cone viscometer) | 7.9 dPas |

1.2 Crosslinking agent 2 according to the invention

A crosslinking agent is prepared, analogously to the process described above, from:
529 parts of Lupranat MM 103
184 parts of methyl isobutyl ketone
0.2 part of dibutyltin dilaurate
517 parts of butyldiglycol (1)
273 parts of methyl isobutyl ketone
21 parts of glycerol (2)
626 parts of Basonat PLR 8638
411 parts of di-n-butylamine
445 parts of methyl isobutyl ketone (1) Diethylene glycol monobutyl ether (MW 162). The NCO equivalent is 2400 after this reaction.

(2) After the glycerol has reacted, the NCO content is 0 and the OH number is 13.0 mg of KOH/g of solids.

A clear, low-vicosity solution which does not crystallize even after storage for a long time is obtained. The characteristic values are:

| Solids content (1 hour at 130° C.): | 70% |
| --- | --- |
| Isocyanate content: | 0 |
| Amine number: | 1 |
| Original viscosity at 23° C.: (plate-cone viscometer) | 6.6 dPas |

1.3 Comparison Example 1.3.1 300 parts of ®Lupranat MM 103, together with 230 parts of methyl isobutyl ketone, are heated to 50° C. and 0.2 part of dibutyltin dilaurate is added. 236 parts of butylglycol are then added dropwise in the course of 30 minutes at 50°–55° C. The reaction mixture is then kept at 50° C. for a further hour. The isocyanate content of the 70% strength solution is then 0. The product is precipitated in a crystalline form from the solution even after storage for a short time.

1.3.2 A crosslinking agent based on an aliphatic polyisocyanate is prepared by adding 129 parts of di-n-butylamine dropwise at 50° C. to 185 parts of ®Basonat PRL 8638 in 78.5 parts of methyl isobutyl ketone. 30 minutes later isocyanate groups can no longer be detected (IR spectrum). The 80% strength solution does not crystallize even after storage for several weeks.

1.3.3 125 parts of the liquid crosslinking agent described above are mixed with 143 parts of the crystalline crosslinking agent described under 1.3.1, and a homogeneous, clear solution is prepared at 50° C. A layer of crystalline sediment forms after storage at room temperature for one week.

1.4 Comparison crosslinking agent 1

A crosslinking agent based on diphenylmethane diisocyanate containing oligomers (Mondur MRS, Mobay Chemical Company) is prepared in accordance with Example of European Patent Application EP-A 0,236,050 from the following ingredients:
1330 parts of Mondur MRS
320 parts of methanol
707 parts of methyl isobutyl ketone
1.6 parts of dibutyltin dilaurate.

The resulting solution has a solids content of 70% and remains stable at room temperature even when stored for a prolonged time.

1.5 Comparison crosslinking agent 2

Another crosslinking agent is prepared in accordance with European Patent Application EP-A 293,088, Example 1.2 (a). However, Lupranat MM 103 is employed instead of "Suprasec VM 20" (manufactured by ICI):
870 parts of Lupranat MM 103
6.42 parts of dibutyltin dilaurate
486 parts of butyldiglycol
134 parts of melted trimethylolpropane
600 parts of ethylglycol The resulting solution has a solids content of 71% (measured at 130° C. for 1 hour). No crystallization takes place when stored at room temperature.

1.6 Comparison example

The procedure is as described under 1.5, but the 486 parts of butyldiglycol are replaced by an equimolar amount of butylglycol (354 parts) and 582 parts of methyl isobutyl ketone are used for dilution instead of the 600 parts of ethylglycol.

The resulting 70% strength solution crystallizes even after a few days and cannot be converted into any useful water-based binder dispersion in combination with the cationic, amine-modified epoxide resin described below.

1.7 Crosslinking agent 3 according to the invention

The principle on which this crosslinking agent is synthesized is similar to that of Example 1.6, but is modified in accordance with the concept of the invention in such a way that the product no longer crystallizes: analogously to item 1.6 870 parts of Lupranat MM 103 and 0.3 part of dibutyltin dilaurate in 237 parts of methyl isobutyl ketone are reacted with 472 parts of butylglycol until the NCO equivalent is 670, and 134 parts of melted trimethylolpropane are then added. As soon as isocyanate groups can no longer be detected, the mixture is diluted with 396 parts of methyl isobutyl ketone to give a solids content of 70%. This intermediate product containing hydroxyl groups has an OH number of 38 mg of KOH/g of solids. 1098 parts of Basonat PLR 8638 (NCO equivalent weight 183) are then added at 50° C. 10 minutes later 645 parts of di-n-butylamine are added dropwise at such a rate that the temperature remains at 50°–65° C. The mixture is then diluted with 747 parts of methyl isobutyl ketone. The resulting solution has a solids content of 70.5% (1 hour at 130° C.). No crystallization can be observed even after prolonged storage.

2. Preparation of a cationic, amine-modified epoxide resin 43.73 parts of an epoxide resin based on bisphenol A and having an EEW (epoxide equivalent weight) of 188, 8.84 parts of bisphenol A, 10.16 parts of dodecylphenol and 3.08 parts of xylene are placed in a reactor under an atmosphere of nitrogen, and are heated to 130° C. 0.06 part of triphenylphosphine is then added, whereupon the temperature rises briefly to 160° C. After the temperature has fallen to 130° C once more, 0.16 part of N,N-dimethylaminobenzylamine is added and the mixture is kept at 130° C. for approx. 2 hours more, until the EEW has risen to 810. 3.50 parts of butylglycol, 5.30 parts of diethanolamine and 8.13 parts of xylene are then added with cooling. When the temperature has fallen to 90° C. the reaction mixture is kept at 90° C. for a further hour. It is then cooled further and 3.50 parts of propylene glycol phenyl ether and 11.57 parts of isobutanol are added. 1.98 parts of N,N-dimethylaminopropylamine are added at 60° C. The mixture is then kept at 60° C. for a further 2 hours, heated up to 90° C. and kept at this temperature for a further hour until the viscosity of the mixture remains constant, and is then discharged after brief cooling. The pale yellow solution has a solids content of 70.2% (1 hour at 130° C.) and a viscosity of 2.5 dPas (40% strength solution in methoxypropanol, measured on a plate-cone apparatus at 23° C.). The amine content is 1.26 milli-equivalents per g of solid resin.

3. Preparation of water-based binder dispersions

Water-based binder dispersions are prepared from the constituents listed in Table 1 by mixing the resin of item 2, the crosslinking agents, lactic acid and the anti-foaming solution. The mixture is then diluted in portions with the first amount of demineralized water and is then diluted in portions with the second amount of demineralized water. It is then stirred for a further 30 minutes. Finally, the volatile solvents are removed by vacuum distillation and are quantitatively replaced by demineralized water.

4.07 parts of N,N-dimethylaminopropylamine is then added in the course of 6 minutes, whereupon the temperature rises to 110° C. The mixture is kept between 110° and 115° C. for 1 hour, and 6.45 parts of butylglycol are then added and the mixture is cooled to 77° C. 14.9 parts of nonylphenol glycidyl ether are then added. As a result, the temperature rises to 90° C., and it is kept at this level for 1 hour before the mixture is diluted with 10.03 parts of butylglycol and cooled. The solids content of the highly fluid resin solution is 60%.

In order to prepare the pigment paste, 29.33 parts of water, 1.59 parts of 90% strength acetic acid and 21.60 parts of the resin solution described above are first mixed. 0.7 part of anti-foaming agent (1), 0.5 part of carbon black, 4.8 parts of basic lead pigment, 6.75 parts of extender HEWP (2), 32.48 parts of titanium dioxide (R 900) and 2.25 parts of dibutyltin oxide are then added and the mixture is given a preliminary dispersal for 30 minutes under a high-speed Dissolver stirrer. The mixture is then dispersed for 1 to 1.5 hours in a laboratory mini-mill (Motor Mini Mill, Eiger Engineering Ltd., Great Britain) until it has a Hegmann fineness of less than or equal to 12, and the desired application viscosity is adjusted using further water. The result is a pigment paste which is very stable to demulsification.

(1) "Tristar Antifoam", Tristar Chemical Co., Dallas, USA (2) English China Clay International, Great Britain

5. Preparation of water-based electro-dipping primers and deposition and testing of film coatings In each case 1925 parts of the water-based binder dispersions listed in Table 1 are diluted with 2500 parts of demineralized water and 2 parts of 30% strength lactic acid. 573 parts of the pigment paste described under item 4 are then stirred into each of the binder dispersions thus diluted. The solids content of the solutions is 20%.

The electro-dipping primers are allowed to age for 5 days at room temperature with stirring. The deposition of the film coatings is carried out for 2 minutes at the voltage indicated onto zinc phosphated steel test panels, connected as the cathode, and also onto non-pretreated steel panels, connected as the cathode. The solution temperature is kept at 25° C. in this operation. The wet films which have been deposited are rinsed with demineralized water and baked for 20 minutes at 165° C.

The crosslinking and leveling of the film coatings thus obtained are tested. The results are collated in Table 2.

TABLE 1

Water-based binder dispersions (parts by weight in g)

| | Dispersion | | | | |
|---|---|---|---|---|---|
| | 1 | 2 | 3 (Comparison 1) | 4 (Comparison 2) | 5 |
| Resin of item 2 | 1040 | 1040 | 1040 | 1040 | 1040 |
| Crosslinking agent of item: | 1.1 | 1.2 | 1.4 | 1.5 | 1.7 |
| Crosslinking agent, amount | 560 | 560 | 560 | 560 | 560 |
| Lactic acid (88% strength) | 41 | 41 | 41 | 41 | 41 |
| Anti-foaming solution[1] | 2 | 2 | 2 | 2 | 2 |
| Demineralized water 1 | 597 | 597 | 597 | 597 | 597 |
| Demineralized water 2 | 960 | 960 | 960 | 960 | 960 |
| Solids content, determined after the distillation (1 hour at 130° C.) | 34.4% | 35.2% | 35.5% | 34.6% | 34.3% |
| Chloride content (ppm) | 70 | 60 | 180 | 80 | 64 |

[1] 50% strength solution of Surfynol (made by Air Products) in butylglycol.

4. Preparation of a gray pigment paste 27.81 parts of bisphenol A diglycidyl ether, 1.44 parts of xylene and 5.81 parts of bisphenol A are reacted in the presence of 0.002 part of triphenylphosphine at 150°–160° C. until an EEW of 345 has been reached. The mixture is then diluted with 21.61 parts of butylglycol and cooled to 49° C. A mixture of 7.77 parts of 9-amino-3,6-dioxanonan-1-ol and

TABLE 2

| | Testing the baked film coatings | | | | |
| --- | --- | --- | --- | --- | --- |
| | Solution | | | | |
| | 1 | 2 | 3 (Comparison 1) | 4 (Comparison 2) | 5 |
| Dispersion | 1 | 2 | 3 | 4 | 5 |
| Deposition voltage [volts] | 200 | 200 | 250 | 250 | 250 |
| Layer thickness [μm] | 24 | 27 | 18 | 16 | 24 |
| Crosslinking[1] [rating] | 1 | 1 | 3 | 4 | 1 |
| Leveling[2] [rating] | 1 | 1 | 4 | 4 | 2 |

[1] Assessed by rubbing to and fro 20 times with a plug of cottonwool impregnated in acetone,
1 = best value, 5 = poorest value
[2] 1 = best value, 5 = poorest value

We claim:

1. A water-based coating comprising a crosslinking agent which is obtained by
   (I) reacting, in a first stage,
      (a) diphenylmethane diisocyanate and
      (b) a compound selected from the group consisting of a monoalcohol, mixtures of monoalcohols, glycol ethers of the formula $CH_3(CH_2)_n-O-(CH_2-CH_2-O-)_mH$, where n is an integer from 0 to 5 and m is an integer from 1 to 3, and mixtures of glycol ethers of this type, to give an intermediate product (A) containing isocyanate groups, and
   (II) reacting this intermediate product (A) in a second stage with
      (c) a polyol or a mixture of polyols to give an intermediate product (B) containing hydroxyl groups, and
   (III) reacting product (B) in a third stage either with
      (d) a polyisocyanate selected from the group consisting of cycloaliphatic, aliphatic or araliphatic polyisocyanates and mixtures thereof, and
      (e) a monofunctional masking agent or a mixture of such masking agents or with
      (f) a partially-masked polyisocyanate prepared from (d) and (e)
   to give a crosslinking agent which is free from isocyanate groups.

2. A crosslinking agent which comprises masked NCO groups and which is obtained by
   (I) reacting, in a first stage,
      (a) diphenylmethane diisocyanate and
      (b) a compound selected from the group consisting of monoalcohols, mixture of monoalcohols, glycol ethers of the formula $CH_3(CH_2)_n-O-(C-H_2-CH_2-O-)_mH$, where n is an integer from 0 to 5 and m is an integer from 1 to 3 mixtures of glycol ethers of this type, to give an intermediate product (A) containing isocyanate groups, and
   (II) reacting this intermediate product (A) in a second stage with
      (c) a polyol or a mixture of polyols to give an intermediate product (B) containing hydroxyl groups and
   (III) reacting product (B) in a third stage with either
      (d) a polyisocyanate selected from the group consisting of cycloaliphatic, aliphatic and araliphatic polyisocyanates and mixtures thereof, and
      (e) a monofunctional masking agent or a mixture of such masking agents or
      (f) a partially-masked polyisocyanate prepared from (d) and (e)

To give a crosslinking agent which is free from isocyanate groups.

3. A coating as claimed in claim 1, wherein, in the first stage, 30 to 95 percent of the isocyanate groups of the component (a) are masked by the component (b).

4. A coating as claimed in claim 1, wherein component b is selected from the group consisting of glycol ethers of the general formula $CH_3(CH_2)_n-O-(C-H_2-CH_2-O-)_mH$ and mixtures thereof, where n is an integer from 0 to 5, and m is an integer from 1 to 3.

5. A coating as claimed in claim 1, wherein a triol or a mixture of triols is employed as the component (c).

6. A coating as claimed in claim 1, wherein, in the second stage, 1.0 to 2.5, equivalents of hydroxyl groups are employed per equivalent of free NCO groups.

7. A coating as claimed in claim 1, wherein the isocyanurate of hexamethylene 1,6-diisocyanate is employed as the component (d).

8. A coating as claimed in claim 1, wherein component (e) is selected from the group consisting of a secondary monoamine, a ketoxime or mixtures thereof.

9. A coating as claimed in claim 1, wherein at least 10 percent of the hydroxyl groups present in the intermediate product (B) are reacted with an isocyanate group of the component (d) or (f).

10. A coating as claimed in claim 1, wherein, in the first stage, 50 to 90 percent of the NCO groups of the component (a) are masked by the component (b).

11. A coating as claimed in claim 1, wherein component b is selected from the group consisting of glycol ethers of the general formula $CH_3(CH_2)_n-O-(C-H_2-CH_2-O-)_mH$ and mixtures thereof, where n is an integer from 2 to 5, and m is an integer of 1 or 2.

12. A coating as claimed in claim 1, wherein, in the second stage, 1.2 to 1.8, equivalents of hydroxyl groups are employed per equivalent of free NCO groups.

13. A crosslinking agent as claimed in claim 2, wherein, in the first stage, 30 to 95 percent of the isocyanate groups of the component (a) are masked by the component (b).

14. A crosslinking agent as claimed in claim 2, wherein glycol ethers of the general formula $CH_3(CH_2)_n-O-(CH_2-CH_2-O-)_mH$ or mixtures of glycol ethers of this type are employed as the component (b), n being an integer from 0 to 5, and m being an integer from 1 to 3.

15. A crosslinking agent as claimed in claim 2, wherein a triol or a mixture of triols is employed as the component (c).

16. A crosslinking agent as claimed in claim 2, wherein, in the second stage, 1.0 to 2.5 equivalents of hydroxyl groups are employed per equivalent of free NCO groups.

17. A crosslinking agent as claimed in claim 2, wherein the isocyanurate of hexamethylene 1,6-diisocyanate is employed as the component (d).

18. A crosslinking agent as claimed in claim 2, wherein component (e) is selected from the group consisting of a secondary monoamine, a ketoxime or mixtures thereof.

19. A crosslinking agent as claimed in claim 2, wherein at least 10 percent of the hydroxyl groups present in the intermediate product (B) are reacted with an isocyanate group of the component (d) or (f).

* * * * *